United States Patent [19]
Konishi

[11] Patent Number: 4,774,564
[45] Date of Patent: Sep. 27, 1988

[54] ELECTRONIC STILL CAMERA FOR COMPENSATING COLOR TEMPERATURE DEPENDENCY OF COLOR VIDEO SIGNALS

[75] Inventor: Masahiro Konishi, Tokyo, Japan

[73] Assignee: Fuji Photo Film Co., Ltd., Kanagawa, Japan

[21] Appl. No.: 93,910

[22] Filed: Sep. 8, 1987

[30] Foreign Application Priority Data

| Sep. 9, 1986 | [JP] | Japan | 61-210842 |
| Sep. 11, 1986 | [JP] | Japan | 61-212710 |
| Sep. 17, 1986 | [JP] | Japan | 61-217078 |
| Oct. 16, 1986 | [JP] | Japan | 61-244139 |

[51] Int. Cl.⁴ .............................................. H04N 9/73
[52] U.S. Cl. ................................ 358/29; 358/41; 358/909
[58] Field of Search ............... 358/29, 29 C, 41, 43, 358/44, 909, 50

[56] References Cited

U.S. PATENT DOCUMENTS

| 4,584,598 | 4/1986 | Kutaragi | 358/41 X |
| 4,595,946 | 6/1986 | Uehara et al. | 358/29 C |
| 4,646,161 | 2/1987 | Tsuchiya et al. | 358/29 C |
| 4,682,210 | 7/1987 | Ikemura et al. | 358/29 C |
| 4,682,211 | 7/1987 | Kaji | 358/50 X |
| 4,692,794 | 9/1987 | Suzuki | 358/44 |
| 4,692,815 | 9/1987 | Kawahara et al. | 358/909 X |
| 4,727,413 | 2/1988 | Mirura et al. | 358/29 |

FOREIGN PATENT DOCUMENTS

| 55-110486 | 8/1980 | Japan | 358/29 C |
| 56-004993 | 1/1981 | Japan | 358/29 C |
| 57-026976 | 2/1982 | Japan | 358/29 C |
| 58-156274 | 9/1983 | Japan | 358/909 |
| 59-174084 | 10/1984 | Japan | 358/29 C |
| 60-218995 | 11/1985 | Japan | 358/29 C |
| 60-254980 | 12/1985 | Japan | 358/29 C |
| 61-002486 | 1/1986 | Japan | 358/29 C |
| 61-002487 | 1/1986 | Japan | 358/29 C |

*Primary Examiner*—James J. Groody
*Assistant Examiner*—E. Anne Faris
*Attorney, Agent, or Firm*—Birch, Stewart, Kolasch & Birch

[57] ABSTRACT

The output level of color video signals, especially the G-signal or the luminance signal from a solid-state imaging device of an electronic still camera, is maintained constant regardless of the color temperature for optimum adjustment of the white balance. This is made possible in such a manner that the gain of a variable-gain amplifier for white balance adjustment is separately controlled for each of the three primary colors as a function of a measured color temperature, or that the light exposure realized by the diaphragm and the shutter is adjusted as a function of the color temperature. A control circuit for effecting the adjustment includes lookup table data for compensating for color-temperature-dependent sensitivity characteristics of the solid-state imaging device. The color temperature is measured by a color temperature sensor or a sensor sensing the color component of incident light. In such a manner, changes in sensitivity characteristics of the solid-state imaging device or the difference in sensitivity characteristics between the solid-state imaging device and the light measurement device as a function of the color temperature may be compensated.

21 Claims, 9 Drawing Sheets

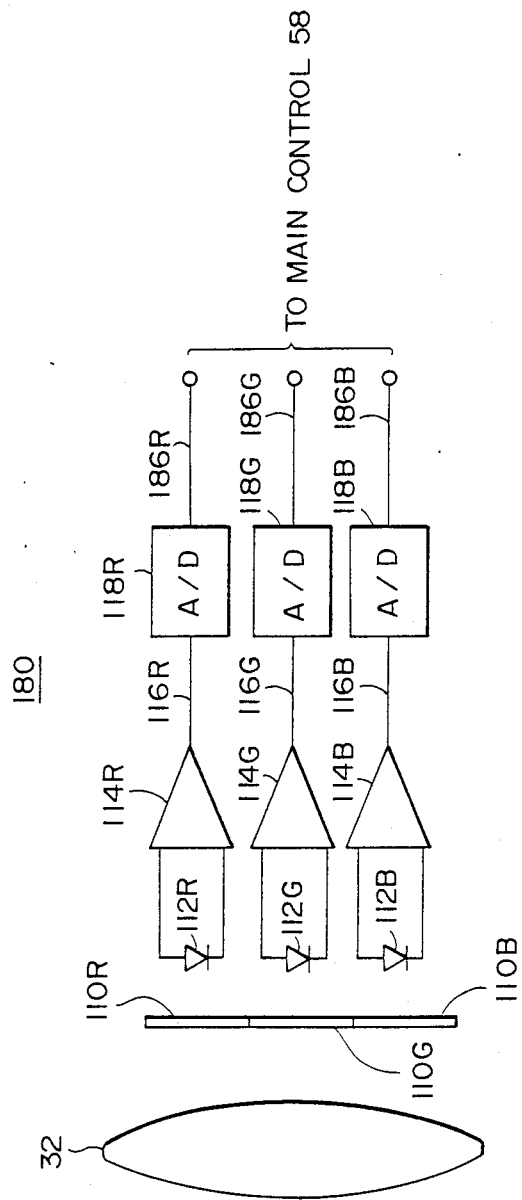

ELECTRONIC STILL CAMERA FOR COMPENSATING COLOR TEMPERATURE DEPENDENCY OF COLOR VIDEO SIGNALS

BACKGROUND OF THE INVENTION

1. Field of the Invention

This invention relates to an electronic still camera. More particularly, it relates to an electronic still camera adapted for shooting or photographing a scene by using a solid-state imaging device to produce color video signals representing the scene.

2. Description of the Prior Art

The electronic still camera is designed, as its appellation implies, to produce color video signals for one field or frame captured on opening the shutter. Optimum exposure and white balance adjustment are required in order to produce a visually impeccable, reproduced image. In the electronic still camera, optimum exposure and white balance adjustment are always required for one-shot video signals. Optimum exposure means that the luminance signal or the green (G) signal obtained from the solid-state imaging device used for photographing the scene presents a substantially constant amplitude level without dependency on the light intensity of the scene. Optimum white balance adjustment implies making the signal level of the three colors of red (R), green (G) and blue (B) substantially equal to each other with respect to an image having no color tint.

Accordingly, the exposure control of the electronic still camera uses the same system as that for a conventional, silver-halide film still camera, for example, one in which the light transmitted through an objective lens is measured to adjust the shutter opening time as well as the light stop (aperture) value on the basis of a measure of the light intensity in order to give an optimum exposure to the solid-state imaging device. For white balance adjustment, a system is adopted in which the ratio of the R- to B-color components is determined by a color temperature sensor to adjust the amplification gains of the R-, G and B video signals on the basis of the determined ratio, similar to a system used in certain video cameras.

Video movie cameras employ an automatic iris control system in which the light stop value is controlled by the feedback control from the video signals for maintaining a constant video signal output level, or an automatic white balance adjustment in which the amplification gains are subjected to feedback control for providing a uniform output level of the R-, G- and B-signals. However, the feedback control system for these movie cameras cannot be used in electronic still cameras, since a faster response is required in the electronic still cameras in order to produce a one-shot scene or picture.

The solid-state imaging device used for electronic still cameras, such as the charge-coupled devices (CCDs), has a narrow dynamic range as compared to that of the conventional silver-halide photosensitive material type photographic film, so that it has not been possible to produce video signals representing an optimum image with the mutually irrelevant light exposure control by light measurement and white balance adjustment by detection of color temperature.

As the conventional white balance adjustment system, it is known to adjust the amplification gains of the R- and B-components of the color video signals produced by the solid-state imaging device so that the signal level of the integrated R- and B-components will be approximately equal to that of the integrated G-component. For example, the R- and B-signal components of the three color-separated signals R, G and B obtained from the solid-state imaging device are separately introduced into variable-gain amplifiers, and the mean signal levels of the output signals are monitored at the output sides thereof for determining the difference in the mean level, with the gains of two variable-gain amplifiers being controlled on the basis of the thus detected difference. This sequence of feedback operation is continued until the integrated signal levels of the R- and B-signals are about equal to each other. Thus it may be seen that, in this white balance adjustment system, the R- and B-signal levels are corrected with the G-signal as the reference. In other words, this system is predicated on the fact that the mean level of the G-signal remains constant without dependency on the color temperature.

However, in general, the signal level of the video signals developed from the solid-state imaging device depends on the color temperature of the incident light on the imaging device. For example, the output characteristics of the three color-separated signals R, G and B of the CCD solid-state imaging device are shown in FIG. 5, from which it is seen that the output level of the G-signal is lower at color temperatures below 3000° K. than at color temperatures higher than 3000° K. This chart shows changes in the output signal from the imaging device for the constant value of the integrated light intensity of the incident light on the solid-state imaging device. Hence, even if the amplification gains should be adjusted in dependence upon the color temperature of the scene as sensed by the color temperature sensor so that the mean signal level of the R- and B-signals are about equal to each other, an error may be caused to the mean signal level of the G-signal obtained at that time depending on the color temperature of the incident light. In such a case, an optimum white balance is not realized in the video signals produced from the gain-adjusted amplifiers.

In addition, the solid-state imaging device and the photodiode used for light measurement have different color temperature dependent sensitivities to the G-signal or luminance signal. For this reason, the luminance signal or the G-signal obtained from the solid-state imaging device cannot be made constant when the light transmitted through the object lens is sensed by a photodiode to control the shutter and/or diaphragm accordingly for adjusting the light exposure.

FIG. 6 shows for example the difference in the CCD sensor output with the color temperature in the case where the output of an auto-iris sensor of the silicon photodiode for light measurement is made constant. It may be seen from this figure that the luminance or brightness signal output Y obtained by a predetermined formula of signal mixing such as $Y = 0.3R + 0.59G + 0.11B$, indicated by a chain line, is also changed with the color temperature, such that, in the vicinity of the color temperature of 3000° K. becomes low since the sensitivity of the CCD sensor to the luminance signal is low.

Hence, in the system in which the shutter speed and/or the light stop value are adjusted in dependence upon the light intensity obtained by a light measuring device, such as a photodiode, the output G- or luminance signal level from the CCD imaging device cannot be adjusted to a constant optimum value in dependence upon the deviation in the spectral component of the incident light from the CCD imaging device, so that it is sometimes impossible to produce the video signals indicating an optimum image.

For example, the CCD imaging device is low in sensitivity at the color temperature of approximately 3000° K., such that the output of the G-signal or the luminance signal from the CCD imaging device is low and is not constant even when the shutter speed and/or the light stop value is adjusted so that the G-component or the luminance signal is maintained at a predetermined level in accordance with the light intensity produced by the light measuring element.

In such a manner, in the conventional electronic still cameras, the light measuring device and the solid-state imaging device have different sensitivity characteristics to the color temperature, such that it is difficult to control the light exposure to provide constant output G- or luminance signals.

As noted hereinabove, the sensitivity of the solid-state imaging device to the G-signal is not constant and differs from that of the light-measuring photodiode output in dependence upon the color temperature. It is herefore necessary to adjust the G-component output so as to be constant in consideration of the color temperature and to correct the levels of the R- and B-signals using as the reference the G-signal made to be constant. However, when for example the light exposure is controlled so as to make the G-signal constant, the color temperature dependent sensitivities of the R- and B-signals are also changed by the changes in the light exposure. This results in changes in the amount of correction of the R- and B-signals aimed to adjust the white balance so that an optimum white balance has not been attained.

SUMMARY OF THE INVENTION

It is therefore an object of the present invention to provide an electronic still camera producing color video signals of which color-temperature dependency is compensated for.

According to the present invention, there is provided an electronic still camera capable of producing color video signals from a solid-state imaging device, especially those color video signals in which the output level of the G- or luminance signals is maintained at a constant level without dependency on the color temperature and in which the white balance is adjusted to an optimum state. This is realized by controlling the gains of the variable-gain amplifiers for white balance adjustment independently with respect to the three primary colors in dependence upon the measured color temperature or by adjusting the light exposure by adjusting the diaphragm and the shutter, again in dependence upon the color temperature. The control circuit performing such adjustment has lookup table data used for compensation of the color temperature dependent sensitivity characteristics of the solid-state imaging device. The color temperature is measured by a color temperature sensor or the sensor sensing a color component of the incident light.

In accordance with the present invention, there is provided an apparatus for adjusting the white balance of an electronic still camera designed for photographing a scene with a solid-state imaging device to produce color video signals indicating an image of the scene, said apparatus comprising: amplification means for amplifying color separated components of the color video signals and having amplification gains independently adjustable for said color-separated components; photosensitive means for receiving incident light from the scene to produce a first signal in association with a quantity of the incident light; color temperature sensing means for measuring color temperature of the scene to produce a second signal in association with the color temperature; and control means for controlling the gains of said amplification means in response to the first and second signals; said control means adjusting the gains of said amplification means so that average levels of the color-separated components produced from said amplification means are approximately equal to one another and maintained substantially at a predetermined value regardless of the color temperature of the scene.

In accordance with the present invention, there is also provided an apparatus for photographing a scene with a solid-state imaging device to produce color video signals representing an image of the scene, said apparatus comprising: photosensitive means for receiving incident light from the scene to produce a first signal in association with a quantity of the incident light; color temperature sensing means for sensing color temperature of the scene to produce a second signal in association with the color temperature; and light exposure control means for controlling light exposure to said solid-state imaging device in response to the first and second signals; said light exposure control means controlling the light exposure to said solid-state imaging device in accordance with the first signal for compensating differences in sensitivity characteristics caused by changes in the color temperature between said solid-state imaging device and said photosensitive means.

In accordance with the present invention, there is also provided an apparatus for controlling white balance and output signal level of an electronic still camera for shooting or photographing a scene with a solid-state imaging device to form color video signals indicating an image of the scene, comprising: exposure control means for controlling light exposure to said solid-state imaging device; variable amplification means for amplifying color-separated components of the video signals and having adjustable amplification gains for respective ones of the color-separated components; photosensitive means for receiving incident light from the scene to produce a first signal in association with a quantity of the incident light; color temperature sensing means for measuring color temperature of the scene to produce a second signal in association with the color temperature; control means responsive to the first and second signals for controlling said exposure control means and said variable amplification means; said control means maintaining output of the color video signals substantially at a predetermined level in such a manner as to compensate for changes in white balance and difference in sensitivity characteristics of said solid-state imagnng device from said photosensitive means due to the quantity of the incident light and the color temperature, while adjusting the white balance.

In accordance with the present invention, there is also provided a camera control apparatus for an electronic still camera for photographing a scene by a solid-state imaging device to form color video signals representing the scene comprising: exposure control means for controlling light exposure to said solid-state imaging device; variable amplification means for amplifying color-separated components of the color video signals and having adjustable amplification gains for respective ones of the color separated components; incident color component sensing means for receiving light incident from the scene to produce signals in association with respective color components of the incident light; and control means for controlling said variable amplification means and said exposure control means in response to signals from said incident color component sensing means; said control means maintaining output of the color video signals substantially at a predetermined level and adjusting white balance in such a manner as to compensate for changes in the white balance and difference in sensitivity characteristics between said solid-state imaging device and said sensing means caused by the variable incident light quantity and the color temperature of said scene.

BRIEF DESCRIPTION OF THE DRAWINGS

The objects and features of the present invention will become more apparent from the consideration of the following detailed description taken in conjunction with the accompanying drawings in which:

FIG. 9 is a schematic block diagram showing the incident color component sensor in the embodiment shown in FIG. 8.

DESCRIPTION OF THE PREFERRED EMBODIMENTS

In the accompanying drawings, there is illustrated an electronic still camera according to a preferred embodiment of the present invention.

Figure 1:
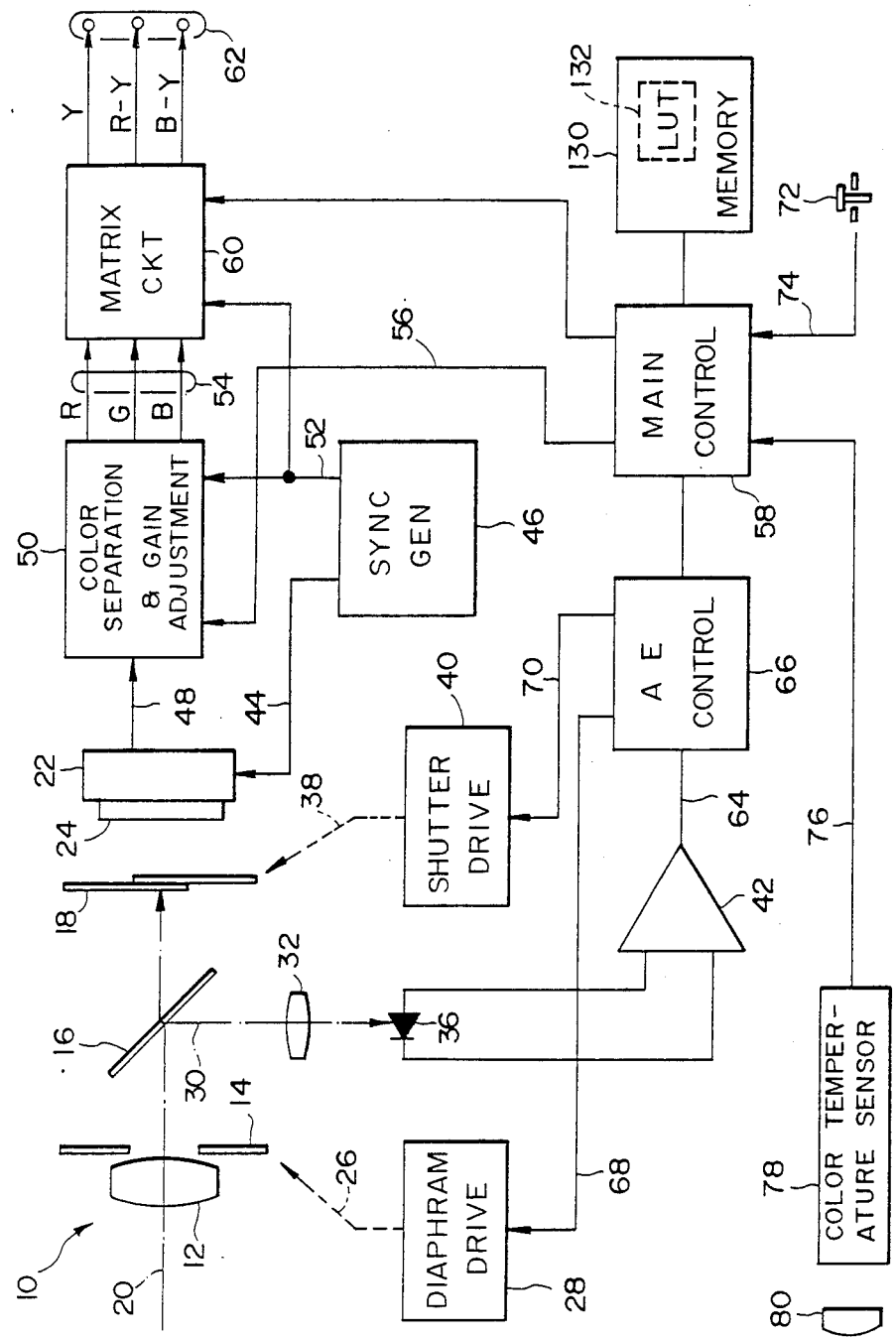
FIG. 1 is a schematic functional block diagram showing an embodiment of an electronic still camera according to the present invention.

Referring to FIG. 1, the present embodiment comprises an imaging optical system 10 made up of an imaging lens 12, a diaphragm 14, a beam splitter 16 and a shutter 18, arranged on an optical axis 20 of lens 12 as shown. Behind the shutter 18, there is arranged a solid-state imaging device 22 such as CCD.

The imaging lens 12 forms the image of a scene on an array of photosensitive cells 24 of a solid-state imaging device 22. The diaphragm 14 is an exposure adjustment unit for adjusting the quantity of the incident light on the photosensitive cell array 24. The diaphragm stop is driven by a diaphragm drive 28 as indicated at a dotted line 26. The beam splitter 16 is placed at an angle of 45° relative to the optical axis 20 for deviating a portion 30 of the incident light from the lens 12. The deviated light is directed towards a photosensitive element 36 via a lens 32. The shutter 18 is a light exposure mechanism adapted for exposing the photosensitive cell array 24. The opening and closure of the shutter 18 is controlled by a shutter drive unit 40 as indicated by a dotted line 38.

In the present embodiment, the element 36 is designed as a photodiode connected to the input of a logarithmic amplifier 42. The lens 32 condenses the deviated light 30 to a light receiving section of the photosensitive device 36. In this manner, the photosensitive device 36 plays the role of the so-called TTL intensity measurement system by exhibiting a current conducting state proportional to the intensity of light incident through the imaging lens 12.

In the present embodiment, the imaging device 22 is a CCD color imaging device having a drive input 44 connected to a drive signal output of a sync generator 46, and an image signal output 48 connected to a color separation and gain control section 50. The sync signal generator 46 has a reference oscillator operating autonomously at a stable frequency to supply at an output 44 horizontal and vertical drive clocks while supplying at another output 52 horizontal and vertical sync signals. The solid-state imaging device 22 operates to store electrical charges associated with the image of an object exposed to the array of photosensitive cells 24 upon opening the shutter 18 to supply at an output 48 color video signals corresponding to the stored charges in response to drive clocks from the drive input 44.

Figure 2:
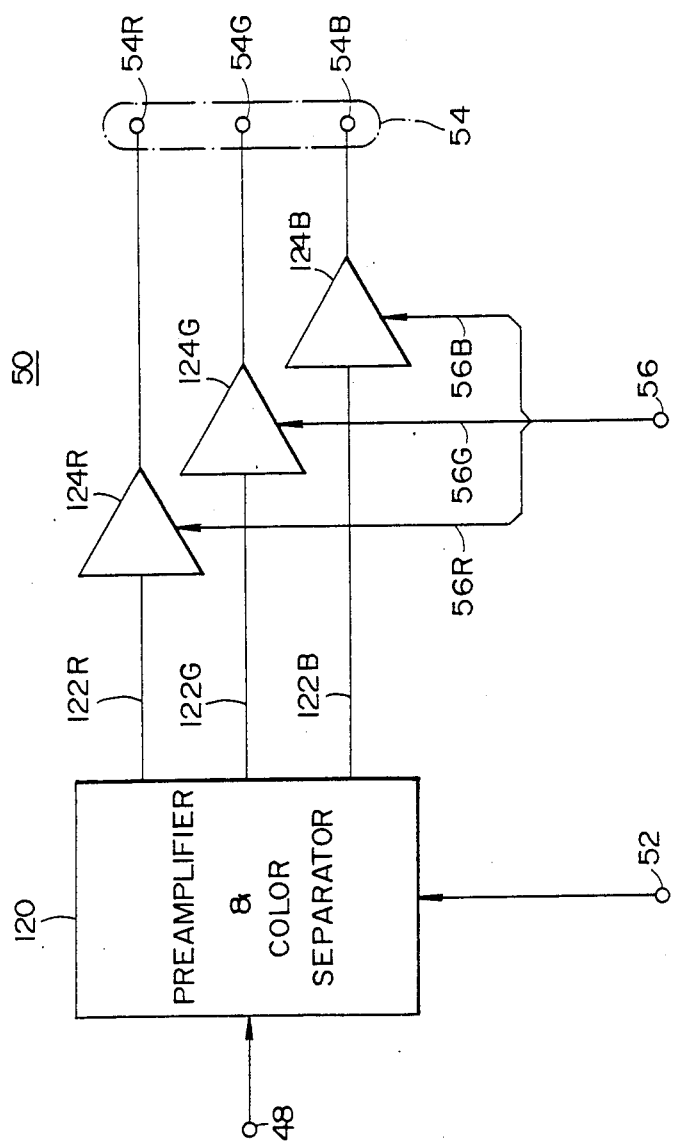
FIG. 2 is a functional block diagram showing an example of the color separation and gain adjustment unit in the embodiment shown in FIG. 1.

As shown in FIG. 2, a color separation and gain adjustment unit 50 includes a preamplifier and color separation circuit 120 for amplifying color video signals supplied from the solid-state imaging device 22 to the input 48, while separating the color input video signals in response to sync signals supplied from the sync signal generator 46 to the sync input 52 into three color components of red (R), green G and blue B . The circuit 120 supplies these red (R), green (G) and blue (B) signals at outputs 122R, 122G and 122B, respectively.

These outputs 122R, 122G and 122B are connected to variable-gain amplifiers 124R, 124G and 124B, respectively. The values of the gain of these amplifiers 124R, 124G and 124B are variable independently of one another, and can be set from a main control unit 58 through control lines 56R, 56G and 56B included in a main control line 56 from the control unit 58. The variable-gain amplifiers operate to amplify the video signals at the respectively set gain values to supply the amplified video signals at associated outputs 54R, 54G and 54B.

Referring again to FIG. 1, the output 54 of the adjustment unit 50 is connected to an input of a matrix circuit 60 designed to produce a brightness or luminance signal Y and chrominance or color-difference signals R-Y and B-Y from the three color components R, G and B introduced from the color separation and gain adjustment unit 50 to supply these signals at an output 62. The luminance signal is produced by combining these three-color components of the incident light according to, for example, a predetermined rule of $Y=0.11B+0.59G+0.30R$. The chrominance signals R-Y and B-Y are produced in a line-sequential fashion.

A logarithmic amplifier 42 is designed for logarithmic compression of output signals from the photosensitive device 36 to supply the resulting signals at an output 64 which is connected to an input port of an auto-iris controller or AE controller 66. In the present embodiment, the AE controller 66 has an analog-to-digital (A/D)

converter for converting the signals at the input 64 into corresponding digital data. A processing system, such as a micro-processor, may be used advantageously for the AE controller 66. The output ports 68 and 70 of the AE controller 66 are connected to diaphragm drive unit 28 and to the shutter drive unit 40.

The AE controller 66 is so designed that the signals indicating the light intensity measured at the photosensitive device 36 are produced therefrom to the main control 58, and that the diaphragm drive 28 and the shutter drive 40 are controlled in accordance with signals indicating the compensated light quantity supplied from the main control 58, as later described, for controlling the light exposure to the array of photosensitive cells 24. The AE controller 66 may also be so designed that the diaphragm drive 28 and the shutter drive 40 are directly controlled in accordance with a light intensity measured at the photosensitive element 36.

The above-described components of the present electronic still camera are controlled by the main control unit 58. The still camera has a shutter release button 72 having an output 74 connected to an input port of the control unit 58. A memory 130 adapted for storage of data and/or programs necessary for controlling the present still camera is connected to the control unit 58. In the present embodiment, the control unit 58 and the memory 130 are advantageously constituted by a processing system such as a microprocessor. The control unit 58 is so designed as to control the AE controller 66, color separation and gain adjustment unit 50 and the matrix circuit 60 responsive to shutter release signals supplied from the shutter release button 72 over control line 74 to effect photographing, that is, light exposure to the array of the photosensitive cells 24 and reading of the video signals from the solid-state imaging device 22. In the memory 130, there are stored data for lookup tables or LUTs 132 used for producing signals controlling the diaphragm control 28, shutter drive 40 and the variable gain amplifiers 124R, 124G and 124B using output signals 64 from the photosensitive device 36 and output signals 76 from a color temperature sensor 78, as later described.

Figure 3:
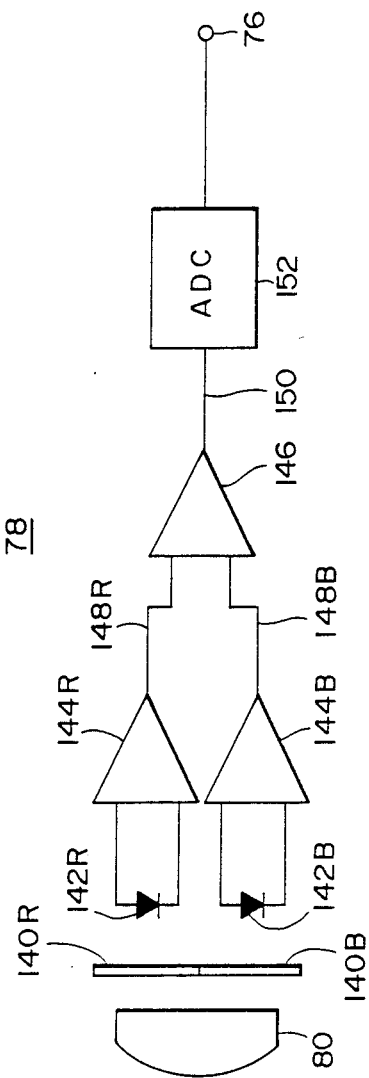
FIG. 3 is a functional block diagram showing an example of the color temperature sensor in the embodiment of FIG. 1.

The color temperature sensor 78 has its output 76 connected to an input port of the control unit 58, and has the function of measuring the color temperature of the scene to supply the measured data at the output 76. As shown in FIG. 3, the color temperature sensor 78 is so designed that the light incident from a scene to be shot through an optical aperture 80 for color temperature measurement is sensed by photo-diodes 142R and 142B through an R-filter 140R and a B-filter 140B. The R-filter 140R is an optical filter adapted for transmitting the red light or R-light and, in side-by-side relation to the filter 140R, a B-filter 140B is mounted so as to divide the optical aperture 80 into two equal portions. The B-filter 140B is an optical filter adapted for transmitting the blue light or B-light.

The currents passing through the photo-diodes 142R and 142B as a function of the incident light transmitted through the filters 140R and 140B are logarithmically compressed in the logarithmic amplifiers 144R, 144B before being introduced into the differential amplifier 146. The amplifier 146 produces at its output 150 an output signal as a function of the difference between the inputs 148R and 148B, this signal being introduced into an analog to digital converter (ADC) 152 where it is converted into the digital data representative of the difference between the two color components R and B. These data are then supplied at its output 76 as the color temperature data of the scene to be shot or photographed.

Figure 4:
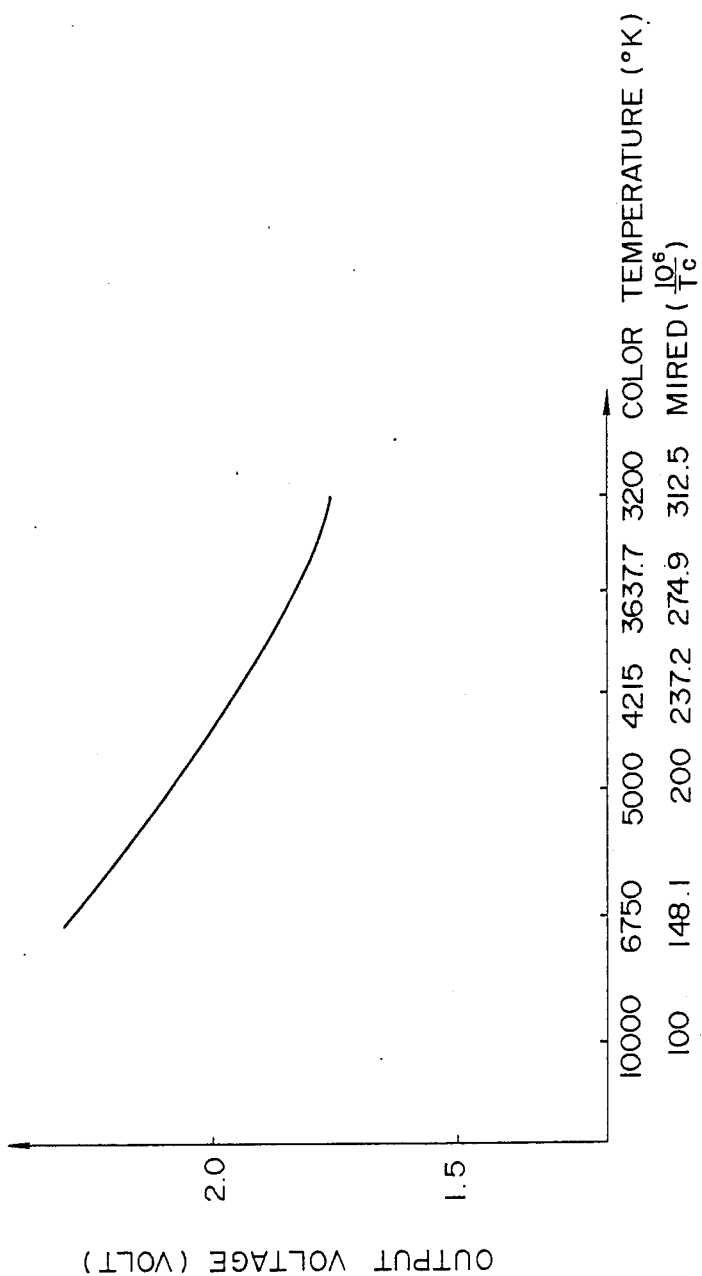
FIG. 4 plots output characteristics of the color temperature sensor shown in FIG. 3.

FIG. 4 shows the relation between the color temperature Tc and the output voltage of the color temperature sensor 78. As shown therein, when the color temperature is higher, that is, when the mired ($10^6$/color temperature Tc) is lower, a larger output is produced from the color temperature sensor 78.

In dependence upon the signal indicating the light volume obtained from the AE controller 66 and upon the signal indicating the color temperature obtained from the color temperature sensor 78, the main control 58 reads out corresponding data of the lookup tables 132 from the memory 130. The control unit 58 operates to produce therefrom signals controlling the diaphragm 14, shutter 18 and the variable gain amplifiers 124R, 124G and 124B for supplying signals controlling the driving of the diaphragm 14 and the shutter 18 to the AE controller 66. The control unit 58 also provides the variable gain amplifiers 124R, 124G and 124B with signals 56 for controlling the gains of the variable gain amplifiers 124R, 124G and 124B.

When producing at the main control 58 signals used for controlling the driving of the diaphragm 14 and the shutter 18 on the basis of the lookup tables 132, the unit 58 operates to correct the signals from the AE controller 66 indicating the light volume with the signal 76 from the color temperature sensor 78 indicating the color temperature, while also operating, on the basis of the corrected light volume, signals 68, 70 controlling the diaphragm drive 28 and the shutter drive 40.

Figure 5:
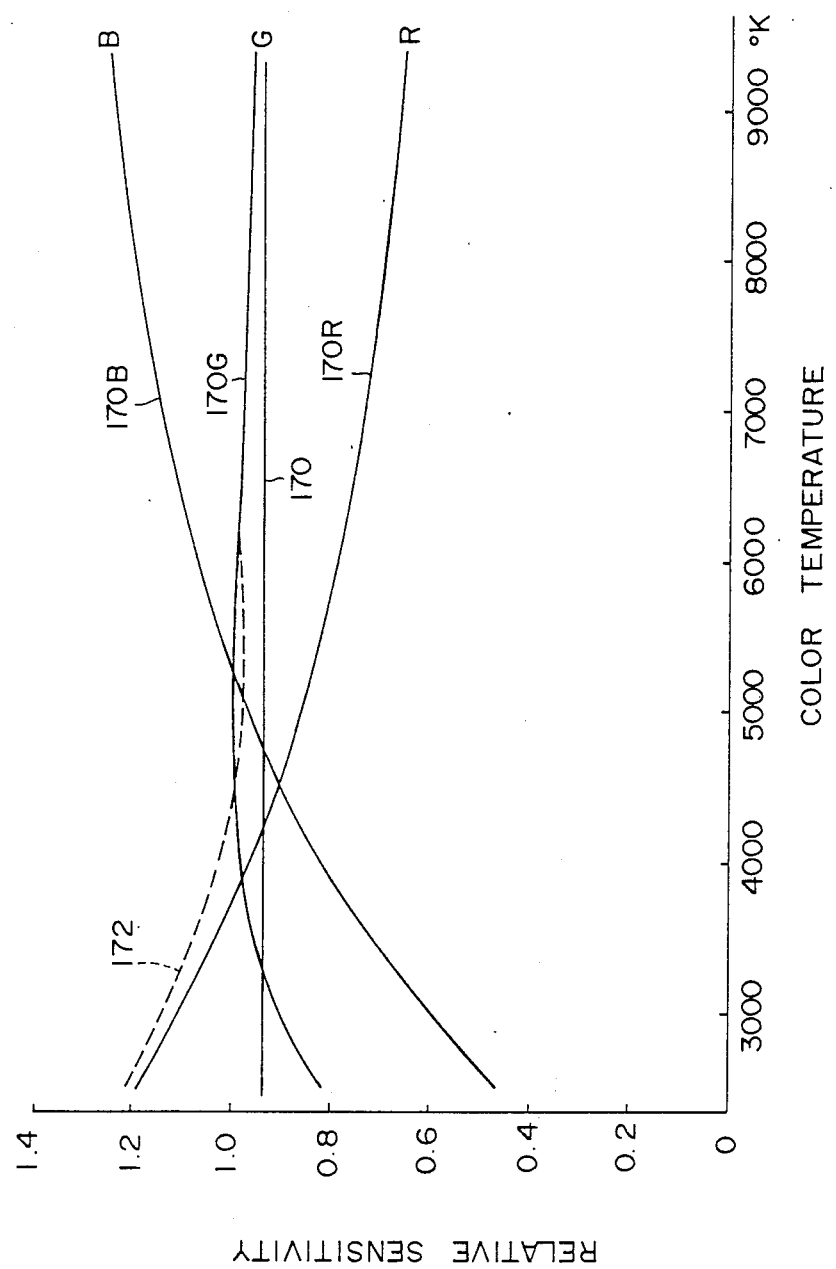
FIG. 5 plots typical color temperature characteristics of the output signal level of the CCD solid-state imaging device and a typical output level curve after adjustment of the amplification gain.

This correction for the light volume is performed at a lookup table composed of data indicated by a dotted line 172 shown for example in FIG. 5. As shown by a solid line 170G, the solid-state imaging device 22 has the lower sensitivity to the G component for lower color temperatures. Hence, the lookup table data having characteristics indicated by the dotted line 172 in FIG. 5 are used to compensate for the lowered sensitivity of the CCD sensor 22 to for example the G-component for the lower color temperature. Thus, compensation is made of the sensor 22 for the lower color temperature so that the sensor 22 will develop the G-component at a higher level, that is, that more light volume will be incident on the CCD sensor 22.

In this manner, compensation is made at the main control 58 so that the light volume data supplied from the AE controller 66 will be lesser in the case of the lower color temperature as indicated by the signals from the color temperature sensor 78. In accordance with the corrected light volume data, signals are produced that will control the diaphragm drive 28 and the shutter drive 40 to increase the exposure light volume further, these signals being produced to the AE controller 66. In this manner, the diaphragm 14 and the shutter 18 are controlled for increasing the exposure light volume further, so that the light volume incident on the CCD device 22 is increased. Since the CCD sensor 22 has a lower sensitivity to the G-component for the lower color temperature, as indicated by the solid line 170G in FIG. 5, the volume of the incident light is increased to provide a constant G-component output.

Control at the overall control unit 58 is also made so that, as described later, the respective gain values of the amplifiers 124R, 124G and 124B of the color separation and gain adjustment unit 50 are separately adjusted for the three colors of red (R), green (G) and blue (B), as a function of the color temperature data obtained at the color temperature sensor 78, such that the video signals will be produced at outputs 54R, 54G and 54B at approximately equal integration level for each of the three colors R, G and B. A white balance adjustment system is realized by the color temperature sensor 78, control unit 58 and the color separation and gain adjustment unit 50.

It will be noted that, in FIG. 1, there is not shown a record function part of the electronic still camera realized as the embodiment of the present invention, that is, a function part for recording the video signals at the output 62 on the video signal recording medium such as the video floppy. Although these function parts are omitted for the simplicity of the drawings and the description, they are provided in effect in the present embodiment for realizing the complete function as a camera.

As described above, the CCD used as the solid state imaging device 22 generally has the color temperature characteristics of the output signals as indicated for example in FIG. 5. Thus the CCD has the relative sensitivities for the R-, G- and B-color signals as indicated by the curves 170R, 170G and 170B, respectively. This graph shows the changes relative to the color temperature of the signals developed from the imaging device 22 for the constant output of the AE system, that is, for the constant integrated light volume incident on the solid-state imaging device 22. It is seen from the graph that the output level 170G of the signal G is lower at a temperature below the color temperature of 3000° K. than at a temperature above 3000° K. The same may be said of the blue signal (B-signal) 170B. Conversely, the output level of the R-signal is decreased with the increase in the color temperature.

In the present embodiment, the respective gain values of the variable gain amplifiers 124R, 124G and 124B are controlled at the color temperature sensor 78 in dependence upon the color temperature so that the integrated signal levels at the respective outputs 54R, 54G and 54B will be approximately equal to one another and constant regardless of the sensed values of the color temperature, in such a manner as to maintain an optimum white balance of the video signals at the output 54. In sum, the gain values of the variable gain amplifiers 124R, 124G and 124B are adjusted in such a fashion that three curves 170R, 170G and 170B in FIG. 5 will be approximately coincident with one another without color temperature dependency and will assume the shape of a generally flat curve 170. The curves 170R, 170G and 170B shown in FIG. 5, while being proper to the kind of solid material of the solid-state imaging device 22, will differ with the integrated light volume of the incident light on the imaging device 22. Therefore, in the present embodiment, several different color temperature characteristic curves are provided as a function of the light volume measured by the AE light measurement unit.

More in detail, data representative of these color temperature characteristic curves is stored in the form of several lookup tables 132 for white balance adjustment. Thus these are stored in the ROM of the memory 130 conversion table data for retrival of the gain values to be adjusted of the variable gain amplifiers 124R, 124G and 124B, with the light volume of the viewed and photographed scene sensed by the color temperature sensor 78 and the color temperature sensed by the color temperature sensor 78 as parameters.

The overall control 58 consults the lookup tables 132 stored in the memory 130, based on a TTL light volume measured by the AE controller 66 and color temperature data obtained at the color temperature sensor 78. The unit 58 then operates to derive gain setting for each of the variable gain amplifiers 124R, 124G and 124B from the lookup tables 132 for setting them in the variable gain amplifiers 124R, 124G and 124B through control lines 56R, 56G and 56B. After light exposure to, and reading out of the video signals from, the solid state imaging device 22, the variable gain amplifiers 124R, 124G and 124B operate to amplify the video signals in accordance with the gain values set therein in the above manner, so that video signals R, G and B with properly set white balance are developed at the outputs 54R, 54G and 54B.

In this case, adjustment of the gain values of the variable gain amplifiers 124R, 124G and 124B is made in consideration that the color temperature dependent sensitivity shown in FIG. 5 is changed with changes in the incident light volume caused by adjustment of the light exposure obtained by the manipulation of the diaphragm 14 and the shutter 18.

It will be noted that, when the outputs 54R, 54G and 54B of the red (R), green (G) and blue (B) colors are adjusted for white balance adjustment, the level of the G signal or that of the luminance signal Y will be different from the level obtained by adjustment of the diaphragm 14 and the shutter 18. The data of the lookup tables 132 are set so that the G signal or the brightness signal Y will be constant through the elimination of the error or difference. In such a manner, the signals for controlling the gain values R, G and B serve to equate the average levels of the R, G and B color outputs 54R, 54G and 54B with one another to adjust the white balance, while also serving to correct by white balance adjustment error in the exposure light volume made constant by the above described adjustment of the diaphragm 14 and the shutter 18.

Figure 6:
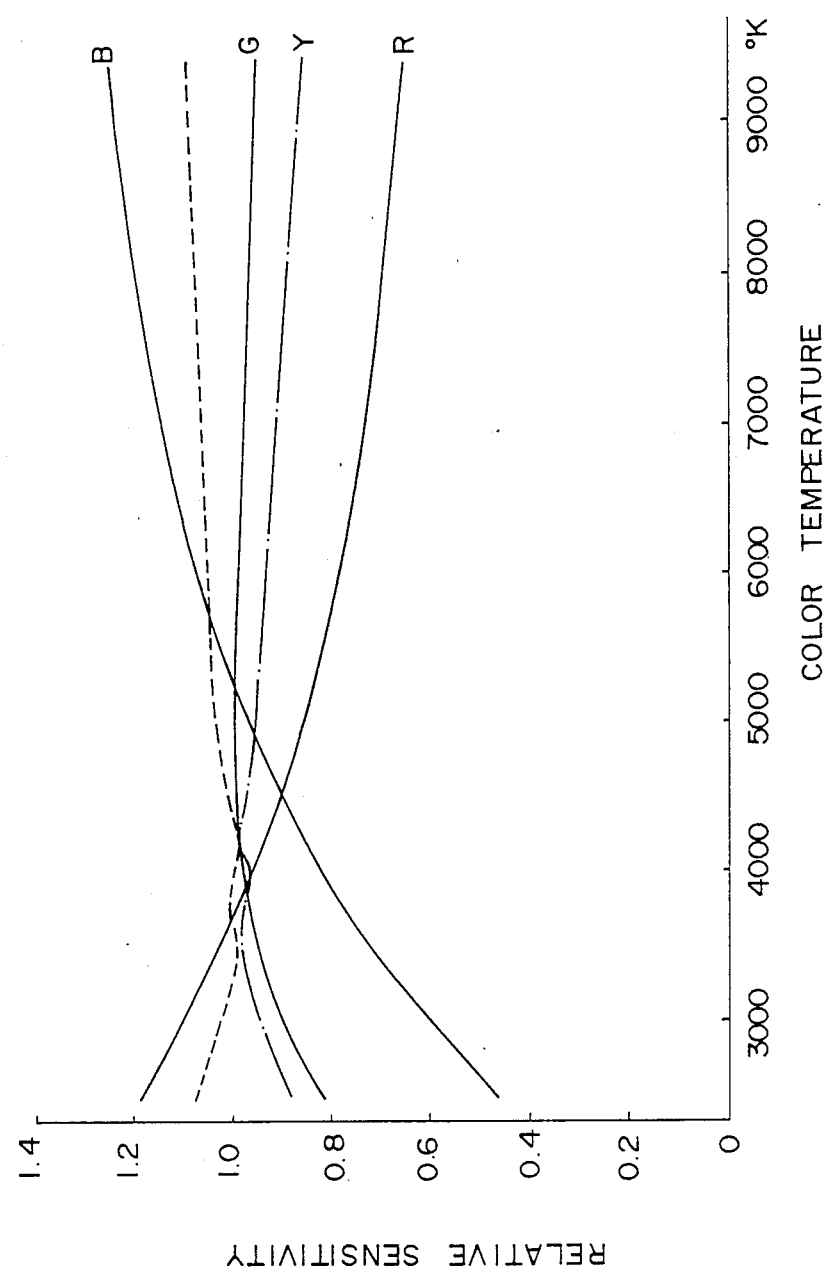
FIG. 6 plots changes in the CCD sensor sensitivity with the color temperature for the constant auto-iris sensor output.

The color temperature sensitivity of the luminance signal Y produced at the matrix circuit 60 from the output of the solid-state imaging device 22 is as indicated by the chain line in FIG. 6. When controlling the light exposure so as to render the luminance signal Y constant, the lookup tables 132 read out from the memory 130 are used to comensate for the decreased CCD sensor sensitivity in the case of the lower color temperatures as indicated by the dotted lines in FIG. 6. Simultaneously, the gains R, G and B of the variable gain amplifiers 124R, 124G and 124B are controlled in order to adjust the white balance, as described hereinabove.

In operation, the shutter release button 72 is actuated by two-stage strokes. Responsive to movement of the release button to its first stage, the overall control 58 operates to start the AE controller 66 to effect TTL light measurement by the photosensitive device 36, to sense the color temperature by the color temperature sensor 78, to control the diaphragm 14 by the diaphragm drive 28 and to control the shutter 18 by the shutter drive 40. More specifically, the AE controller 66 operates to measure the intensity of the light incident from the scene through the lens 12 by the photosensitive device 36 to supply a measured light intensity to the main control 58. The color temperature sensor 78 senses the color temperature of the light incident through the aperture 80 to supply the sensed output to the main control 58. As stated hereinabove, the main control 58 is responsive to the light volume signal from the AE controller 66 and to the color temperature signal from the color temperature sensor 78, for determining the opening degree or the light stop value of the diaphragm 14, the opening or exposure time of the shutter 18 and the gains of the variable gain amplifiers 124R, 124G and 124B, in dependence upon the data of the lookup tables 132 read-out from the memory 130. The light volume signals from the AE controller 66 are corrected in this manner by the color temperature signals from the color temperature sensor 78 and sent back to the AE controller 66. In dependence upon these signals, the AE controller 66 determines the opening degree or the light stop value of the diaphragm 14 and the opening or exposure time of the shutter 18.

When the shutter release button 72 is moved to its second stage, the overall control 58 is responsive thereto to control the operation of the diaphragm drive 28 and the shutter drive 40 in dependence upon the determined values of the light stop and exposure to perform the shooting or photographing with the solid-state imaging device 22. In this device 22, electric charges are stored dependent upon the image of the object formed on the array of the photosensitive cells 24 upon light exposure thereof caused by the opening of the shutter 18. Responsive to the drive clocks from the drive input 44, the color video signals are supplied to the output 48 in accordance with these stored charges.

The color video signals read out from the solid-state imaging device 22 are amplified in the color separation gain adjustment unit 50 while being separated into three color signals R, G and B. It is noted that the gains of the variable-gain amplifiers 124R, 124G and 124B of the color separation and gain adjustment unit 50 are adjusted by the main control 58. This gain adjustment is performed at this time by the color temperature data obtained at the color temperature sensor 78 and the incident light volume or quantity from the scene obtained from the photosensitive device 36. In this manner, the three color component signals R, G and B are produced with the properly adjusted white balance at the output 54 of the color separation and gain adjustment unit 50.

The three color component signals R, G and B produced from the color separation and gain adjustment unit 50 are fed to a matrix circuit 60, where the luminance signal Y is produced in accordance with the predetermined rule of signal mixing. The matrix circuit 60 also forms the chrominance signals R-Y and B-Y while supplying the luminance signal Y at the output 62, and also supplying the chrominance signals R-Y and B-Y line-sequentially at the output 62.

In the present embodiment, as described hereinabove, the gains of the amplifiers 124R, 124G and 124B are adjusted in dependence upon the light volume or intensity of the incident light from the scene and the color temperature for the respective three video colors R, G and B produced from the solid-state imaging device 22 in order to control the average level of the respective color signals R, G and B to be constant independently of the color temperature and substantially equal to one another. This results in the proper adjustment of the white balance of the video signals developed from the solid-state imaging device 22.

In addition, in the present embodiment, the volume of the incident light detected by the photosensitive device 36 is corrected by the color temperature of the incident light sensed by the photosensitive device 36 to compensate for the color temperature dependent sensitivity difference between the solid-state imaging device 22 and the photosensitive device 36. Since the volume of the incident light is adjusted in this manner to compensate for the decreased sensitivity of the solid-state imaging device 22 in the case of the color temperature being as low as, for example, 3000° K., it is possible to obtain the perpetually constant G or Y-signal output at the solid-state imaging device 22 despite changes in the color temperatures.

Thus, even when changes are caused in the color temperature of the light incident on the imaging device 22 from the scene through the imaging lens 12, the level of the G-component of the video signals developed from the solid-state imaging device 22 or that of the luminance signal Y produced from the video signals may be adjusted properly, so that video signals representative of the optimum image may be obtained at the output 62. Light exposure errors caused by the difference in the photosensitive properties of the light intensity measurement device 36 and the imaging device 22, such as depletion or saturation of the light carriers excited by the incident light, as often encountered in the conventional electronic still cameras, may be minimized.

In addition, control of the exposure quantity of the incident light for adjusting the output of the G- or Y-signal and the white balance and adjustment of the gains of the variable-gain amplifiers 124R, 124G and 124B, may be performed by separately controlling the diaphragm 14, shutter 18 and the variable-gain amplifiers 124R, 124G and 124B by consulting the lookup tables 132 taking account of both such control and adjustment. If the output of the G- or Y-signal or the white balance were adjusted after previous adjustment of the white balance or the G- or Y-signal, an error would be introduced into the G- or Y-signal or the white balance, that is, the first adjusted variable. Such error may be avoided in the present embodiment.

In such a manner, even if a difference should be caused in the color temperature or the light quantity incident from the scene to the imaging device 22 through the imaging lens 12, the G-component of the video signals developed from the solid-state imaging device 22 or the luminance signal Y combined from the video signals can be maintained at a constant level, and the white balance can be adjusted properly with the result that the video signals representative of the optimum image may be produced at the output 62.

In the present embodiment, the output level and the white balance are adjusted in such a fashion that the diaphragm 14, the shutter 18 and the gains of the variable-gain amplifiers 124R, 124G and 124B are controlled by the overall control 58 and the AE controller 66 in dependence upon the incident light intensity sensed by the photosensitive device 36 and the color temperature sensed by the color temperature sensor 78. In such a sense, the present embodiment may include not only the case in which the scene may be shot by the electric eye or EE system but also the case in which the scene has to be shot with the EE system out of operation. By referring to the flow chart of FIG. 7, the operation of the present embodiment will be described taking into account whether the EE system should be in or out of operation in shooting the scene.

As shown therein, it is determined at step 200 whether the EE system should remain in operation. If affirmative, the control unit 58 determines at step 202 the opening degree of the diaphragm 14 and the shutter speed from the incident light quantity and the color temperature. It is then determined at step 204 whether the color temperature is within such a range as to be able to control the G-signal to be constant. If the G-signal cannot be maintained constant for the color temperature, the opening degree of the diaphragm 14 and the shutter speed are again determined at step 206, and then the control returns to step 204 in order to determine whether the color temperature is within such a range as to be able to control the G-signal to be constant.

If the G-signal can be controlled to be constant for the color temperature, the control unit 58 operates to control at step 208 the gains of the variable-gain amplifiers 124R and 124B to control the gains of the R- and B-signals so as to make the G-signal output constant to adjust the white balance. Then, the cell array 24 is exposed to light to complete shooting or photographing at 210.

When it is determined at step 200 that the EE system should remain out of operation, it is determined at step 212 whether the G-signal can be maintained at a predetermined constant level and the white balance can be adjusted, judging from the incident light intensity sensed by the device 36 and the light volume of each of the R, G and B color components based on the color temperature sensed by the color temperature sensor 78. If affirmative, any or all of the gains of the variable-gain amplifiers 124R, 124G and 124B are controlled at step 214 to make the photographing at step 210.

When photographing is made with candle light, for example, as an illumination, both the incident light quantity and the color temperature are low, so that it is necessary to control the shutter 18 to increase the light quantity. Simultaneously, the gain of the variable gain amplifier 124R used for amplifying R-signals is not increased, but the remaining amplifiers 124G and 124B are controlled to increase the gains of the G- and B-signals. That is, the G- and B-signals are controlled with the R-signal as the reference to control the output level and white balance. In such a manner, the five parameters, namely parameters, of the diaphragm 14, shutter 18 and the variable gain amplifiers 124R, 124G and 124B, are correlatively controlled so that photographing can be made even in cases wherein the state of the scene is such that the EE system usually cannot be used and hence the scene cannot be photographed successfully.

If it is determined at step 212 that, judging from the light quantity of the respective color components R, G and B of the sensed incident light, it is not possible to render the G-signal at a predetermined constant level and to adjust the white balance, the EE system is disengaged and the photographing is completed at step 216 in the usual manual mode.

When the diaphragm or the shutter speed are determined at steps 202 or 206 in this order, if the shutter speed be selected from a predetermined speed set, such as 1/125, 1/250 or 1/500 second, the shutter speed cannot be set to be intermediate between these speed values. However, in such cases, the gains of the R- and G-signals can be controlled at step 208 in order to produce an output level that would be produced if the shutter speed were at such intermediate level. The same may be said of the case in which the diaphragm and the shutter speed are determined in this order at step 214. Thus, in such case, an output level that would be obtained if the shutter speed were at such intermediate level can be produced by controlling the gains of the R, G and B signals.

Figure 7:
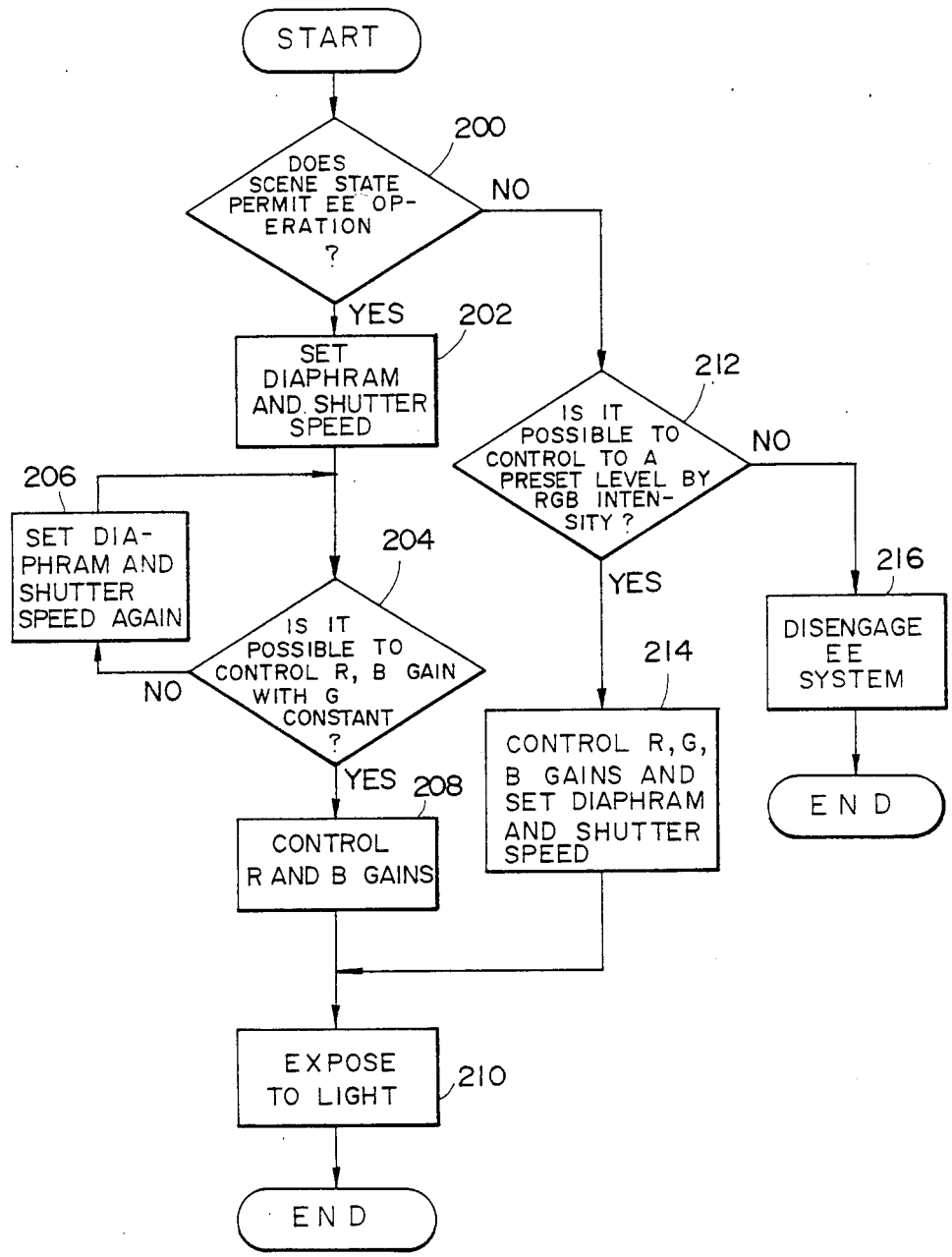
FIG. 7 is a flow chart showing a portion of the operation of the camera shown in FIG. 1.

Although the flow chart of FIG. 7 is drawn for the case in which the output of the G-signal is constant, it is to be noted that a similar operation may be obtained when the luminance signal Y is set at a constant signal.

In the present embodiment, both the exposure control unit and the variable gain amplifying unit are controlled for photographing, and photographing can be made even if the state of the scene is such that the EE system cannot be used and hence need be disengaged.

In the foregoing description, control of the variable gains of the color separation gain adjustment unit 50 and adjustment of the light exposure by the diaphragm 14 and the shutter 18 are made simultaneously. However, it is not always necessary to make both of these operations and the overall control 58 may be so designed as to effect only the gain control of the color separation and gain adjustment unit 50 as a function of the color temperature. It is possible in such a case to produce at the output 62 color video signals with the minimum error of white balance adjustment resulting from color temperature characteristics of the solid state imaging device 22. Alternatively, the main control 58 may be so designed as to make only the adjustment of the light exposure by the diaphragm 14 and the shutter 18 as a function of the color temperature. In such case, it is possible to produce at the output 62 color video signals with a minimum light exposure error caused by the difference in the color temperature dependent sensitivity characteristics of the photosensitive device 36 to the solid state imaging device 22.

Figure 8:
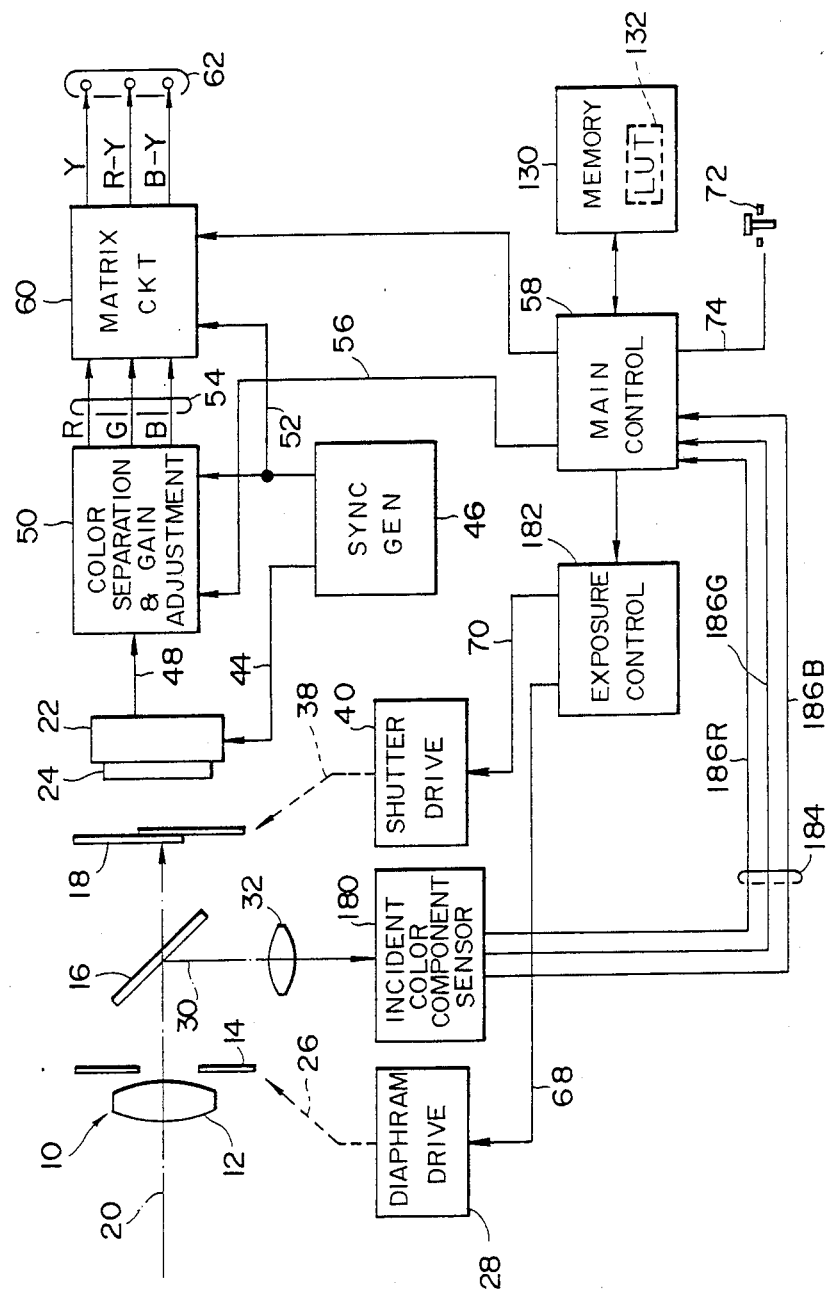
FIG. 8 is a schematic functional block diagram, similar to FIG. 1, showing an alternative embodiment of the present invention.

An alternative embodiment of the present invention will be hereafter described by referring to FIG. 8. In the present embodiment, the intensities of the three component colors are detected, the lookup table data are consulted in dependence upon the light quantity and the color temperature of the incident light, and the light exposure is controlled in accordance therewith to produce a video signal output of the predetermined level to control a color separation and the gain of amplification to adjust the white balance. The present embodiment differs from the preceding embodiment in that an incident light color component sensor 180 is provided to this end in place of the photodiode 36 and the amplifier 42 in the embodiment of FIG. 1, while a light exposure control unit 182 is provided in place of the AE controller 66 in the embodiment of FIG. 1. In the following figures, similar components or structural elements are designated by the same reference numerals, and redundant description will be avoided for simplicity.

In the embodiment of FIG. 8, the reflected light 30 is directed to a lens 32 and thence to an incident light color component sensor 180, an output 184 of which is connected to the input of the main control unit 58.

The incident light color component sensor 180 is shown in FIG. 9 and includes three-color separation filters 110R, 110G and 110B arranged side-by-side in the light path from the lens 32 and photodiodes 112R, 112G and 112B in association with the filters 110R, 110G and 110B. The lens 32 converges the reflected light 30 to the light receiving section of the photodiodes 112R, 112G and 112B. The R-filter 110R is an optical filter capable of transmitting the R-light. In juxtaposition to the R-filter 110R, the G-filter 110G and the B-filter 110B are arranged for sharing one-third portions of the lens surface. The G-filter 110G is an optical filter for transmitting the G-light while the B-filter 110B is an optical filter for transmitting the B-light.

The current flows through the photodiodes 112R, 112G and 112B as a function of the intensities of the respective color components of the incident light transmitted through the R-filter 110R, G-filter 110G and the B-filter 110B, respectively.

The outputs of the photodiodes 112R, 112G and 112B are connected to the inputs of logarithmic amplifiers 114R, 114G and 114B having outputs 116R, 116G and 116B connected respectively to inputs 186R, 186G and 186B of the overall control unit 58 through AD converters 118R, 118G and 118B.

Returning to FIG. 8, an exposure control unit 182 is connected to the main control 58 and has output ports 68, 70 connected to the diaphragm control 28 and the shutter drive 40, respectively.

The exposure control 182 is a functional unit for controlling the light exposure to the array of photosensitive cells 24 by controlling the operation of the diaphragm drive 28 and the shutter drive 40 in accordance with the signals indicating the corrected light quantity transmitted from the control unit 58 as later described.

The above components of the camera are controlled by the main control 58. The electronic still camera has the shutter release button 72 having an output 74 connected to an input port of the control unit 58. To this input port is connected an output 36 of the incident color component sensor 34, such that signals indicating the light quantities of the respective color components of the incident light sensed by the incident light color component sensor 34 will be introduced into the overall control 58.

To this control unit is also connected a memory 130 adapted for storage of data or programs necessary for controlling the present camera. In the memory 130, there are stored lookup tables 132 used for preparing signals for controlling the diaphragm drive 28, shutter drive 40 and the variable-gain amplifiers 124R, 124G and 124B as a function of signals 184 indicating the light intensities of the respective color components of the incident light developed from the sensor 180. The control unit 58 and the memory 130 are advantageously designed as a processing system such as a microprocessor, and are responsive to shutter release signals transmitted from the shutter release button 72 on control line 74 to control the exposure control 182, color separation and gain adjustment unit 50 and the matrix circuit 60, thereby to effect light exposure to the array of photosensitive cells 24 and read-out of video signals from the solid-state imaging device 22.

The control unit 58 operates to determine the incident light quantities on the basis of, for example, the G-component which is one of the color components obtained at the incident color component sensor 180 to determine the opening diameter of the diaphragm 14 and the opening time of the shutter 18 on the basis of the thus determined incident light quantities. It will be noted herein that the solid-state imaging device 22 and the photodiodes 112R, 112G and 112B used for light intensity measurement are different in their sensitivities to the incident light in dependence upon the color temperature. In this consideration, the G-signal from the sensor 180 is corrected taking into account the difference in sensitivies to obtain the G-component to be produced from the solid-state imaging device 22 for controlling the diaphragm 14 and the shutter 18 so that the constant G-signal will be produced at the solid-state imaging device 22.

The color temperature of the scene may be found from the R-, G- and B-signals produced at the incident color component sensor 180 at the main control 58. For example, when the difference between the B- and R-signals is found, it is determined that the larger is the difference between these B- and R-signals, the higher the color temperature. Since the G-signal is also changed with the color temperature, the G-signal is also considered at the main control 58 in addition to the R- and B-signals for accurately determining the color temperature. The value of the G-signal is corrected at the main control 58 by the thus determined color temperature with the sensitivity of the solid-state imaging device 22 taken into account, as later described.

The main control 58 reads out data of the lookup tables 132 from the memory 130 as a function of the signals 186R, 186G and 186B indicating the color components from the incident light color component sensor 180. The control unit 56 then formulates signals controlling the diaphragm 14, shutter 18 and the variable-gain amplifiers 124R, 124G and 124B for developing signals controlling the driving of the diaphragm 14 and the shutter 18 to the exposure control unit 182, while producing signals for controlling the gains of the amplifiers 124G, 124R and 124B to these amplifiers.

The signals controlling the driving of the diaphragm 14 and the shutter 18 are prepared at the main control 58 from the lookup tables 132 in the following manner.

The main control 58 determines the quantity of the incident light from the G-component selected from the color component signals produced at the sensor 180 and, on the basis thereof, determines the opening diameter of the diaphragm 14 and the exposure time of the shutter 18. It is noted that, as shown in FIG. 5, the imaging device 22 and the photodiodes 112R, 112G and 112B are different in their sensitivities to the incident light according to the color temperature. Thus, in the main control 58, the G-signal value from the incident light color component sensor 180 is corrected with such difference in the sensitivities taken into account to obtain the G-signal to be developed from the solid-state imaging device 22. Based on the value of the thus corrected G-signal, the control unit 58 formulates signals 68, 70 to control the diaphragm drive 28 and the shutter drive 40 so that the value of the G-signal produced from the solid-state imaging device 22 will be constant, thereby controlling the diaphragm 14 and the shutter 18.

The light quantity is corrected by the lookup tables 132 composed of, for example, the data indicated by a broken line 172 in FIG. 5. The solid-state imaging device 22 has a low sensitivity to the G-component in the case of a lower color temperature, as indicated by the solid line 170G in FIG. 5. Hence, the lookup table data having the properties as indicated therein by the broken line 172 are used to compensate for the lowering of the sensitivity of the CCD sensor to the G-signal at, for example, the lower color temperature. More specifically, the correction is made so that the G-signal will become larger, that is, more light will be incident to the solid-state imaging device 22 for the lower color temperature.

In such a manner, correction is made in, for example, the main control 58 so that the light intensity data indicated by the G-signal will become lesser in the case of the lower value of the color temperature indicated by the signal from the incident color component sensor 180. In accordance with the corrected light quantity data, signals are produced for controlling the diaphragm 14 and the shutter 18 for further increasing the light exposure, these signals being delivered to the exposure control 182. In such a manner, the diaphragm 14 and the shutter 18 are controlled to increase the light exposure further so that the light quantity incident on the solid-state imaging device 22 is increased. Since the solid-state imaging device 22 has a lower sensitivity to the G-component for the lower color temperature, as indicated by the solid line 170G in FIG. 5, the quantity of the incident light is increased to provide for a constant output of the G-component.

The main control 58 alo operates in such a manner that the gains of the amplifiers 124R, 124G and 124B of the color separation and gain adjustment unit 50 are separately adjusted for the three colors in accordance with the color temperature data obtained at the sensor 180, and by using the lookup table data read from the memory 130. Thus the video signals will be supplied at the outputs 54R, 54G and 54B at approximately the same integration level for each of the three colors R, G and B, for thereby adjusting the white balance of the video signals similarly to the embodiment shown in FIG. 1.

Since the color temperature dependent intensities shown in FIG. 5 are changed in the present embodiment with changes in the incident light quantity caused by adjustment of the light exposure by the diaphragm 14 and the shutter 18, similarly to the embodiment shown in FIG. 1, the gains of the amplifiers 124R, 124G and 124B are adjusted with such situation taken into account.

In operation, the shutter release button 72 is actuated in two-stage strokes. When the release button is pressed to its first stage, the main control 58 operates to effect TTL light measurement and color temperature detection by the incident color component sensor 180, to read out the lookup tables 132 from the memory 130 to determine the opening extent of the diaphragm 14 to output the resulting signal to the exposure control 182 to control the diaphragm 14 by the diaphragm drive 28.

More specifically, the intensities of the respective color components of the incident light from the scene through the lens 12 are measured by the incident color component sensor 180 and the measured light intensities are supplied to the main control 58, where the opening diameter or the light stop value of the diaphragm 14 is determined by consulting the data of the lookup tables 132 read-out from the memory 130 and in accordance with the light intensity signals of the respective color components as described above for developing the resulting signals to the exposure control 182.

When the shutter release button 72 is pressed to its second stage, the main control 58 is responsive thereto to receive from the incident color component sensor 180 signals of the respective color components of the incident light through the diaphragm 14 opened to the degree determined during the first stage and, in accordance with these signals, to consult the lookup table data read from the memory 130 in accordance with these signals to determine the opening or exposure time of the shutter 18 and the gains of the amplifiers 124R, 124G and 124B.

The main control 58 delivers signals indicating the exposure time to the light exposure control 182 to control the shutter drive 40 for photographing the scene by the solid-state imaging device 22. In the device 22, electric charges are stored in accordance with the image of the scene exposed to the array of photosensitive cells 24 upon opening the shutter 18. Responsive to the drive clocks from the drive input 44, color video signals are supplied to the output 48 in accordance with the stored static charges.

The color video signals read-out from the solid-state imaging device 22 are amplified by the color separation and gain adjustment unit 50 and then separated into the three color signals R, G and B. From the main control 58, there are developed signals 56R, 56G and 56B for separately adjusting the gains of the color separation and gain adjustment unit 50 for the respective three colors. In such a manner, the three color signals R, G and B with the pre-adjusted white balance are supplied at the output 54 of the color separation and gain adjustment unit 50.

The three-color signals R, G and B produced from the color separation and gain adjustment unit 50 are introduced into the matrix circuit 60 where the luminance signal Y is produced in accordance with a predetermined rule of signal mixing. The matrix circuit 60 also operates to formulate chrominance signals R-Y and B-Y and to produce the luminance signal Y at the output 62 while supplying the chrominance signals R-Y and B-Y line-sequentially at the output 62.

In the present embodiment, the opening degree of the diaphragm 14, the opening time of the shutter 18 and the gains of the variable-gain amplifiers 124R, 124G and 124B are determined by consulting the data of the lookup tables 182 and in accordance with the color temperature and the light intensity of the incident light sensed by the incident color component sensor 180 composed of the three-color separation filters 110R, 110G and 110B and the three photodiodes 112R, 112G and 112B, for producing a constant output while achieving the white balance.

In such a manner, it is possible to compensate for the difference in sensitivity due to changes in the color temperature between the solid-state imaging device 22 and the photodiodes 112R, 112G and 112B of the incident color component sensor 180 in order to produce a perpetually constant G-signal or Y-signal output at the solid-state imaging device 22 despite changes in the color temperature. Simultaneously, the white balance may be adjusted accurately in accordance with the color temperature and the exposure of the incident light adjusted so as to provide a constant output of the G- or Y-signal output.

In addition, the R-, G- and B-components of the incident light are detected by the incident color component sensor 180 so that the color temperature is detected taking into account also the G-signal, so that the color temperature may be detected more accurately than when the color temperature is detected only from the R- and B-signals as in the prior-art system. Since the incident light quantity is adjusted in such a manner on the basis of the accurate color temperature, it is possible to obtain an accurately constant level of the G- video signal developed from the solid-state imaging device 22 or of the luminance signal Y combined from the video signals.

In addition, since the R, G and B components of the incident light are separately sensed and the white balance is adjusted on the basis of the accurate color temperature, the white balance may be adjusted more accurately than when the incident light is sensed and the white balance is adjusted by its color temperature.

The other operation and features of the present embodiment are similar to those of the preceding embodiment described in connection with FIG. 1. Thus the photographing can naturally be made when the state of the scene is such as makes it necessary to disengage the EE system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What I claimed is:

1. An apparatus for adjusting white balance of an electronic still camera for photographing a scene with solid-state imaging device to produce color video signals presenting an image of the scene, comprising:
   amplication means for amplifying color-separated signals of the color video signals and having amplification gains independently adjustable for each said color-separated signal;
   photosensitive means for receiving incident light from the scene to produce a first signal representing a quantity of the incident light;
   color temperature sensing means for measuring the color temperature of the secene to produce a second signal representing the color temperature; and
   control means for controlling the gains of said amplification means in response to the first and second signals;
   said control means adjusting the gains of said amplification means so that mean levels of the color-separated signals produced from said amplification means are approximately equal to one another and maintained substantially at a predetermined value independent of the color temperature of the scene.

2. An apparatus according to claim 1, wherein, said solid-state imaging device includes a charge-coupled device;
   said control means includes memory means for storing lookup table data used to derive the gains of said amplification means for each respective separated-color signal by using the first and second signals as parameters;
   the gains of said amplification means being adjusted by referring to the table data in accordance with the first and second signals.

3. An apparatus according to claim 2 further comprising:
   color separation means for separating output color video signals from said solid-state imaging device into three primary color signals of red, green and blue;
   said amplification means including three variable-gain amplifiers having adjustable gains for amplifying respective ones of the three primary color signals produced from said color separation means.

4. An apparatus for controlling light exposure of an electronic still camera for photographing a scene with a solid-state imaging device to produce video signals representing an image of the scene, comprising:
   photosensitive means for receiving incident light from the scene to produce a first signal representing a quantity of the incident light;
   color temperature sensing means for sensing the color temperature of the scene to produce a second signal representing the color temperature; and
   light exposure control means for controlling the light exposure to said solid-state imaging device in response to the first and second signals;
   said light exposure control means controlling the light exposure to said solid-state imaging device in accordance with the first and second signals to compensate for the difference in sensitivity characteristics due to the sensed color temperature.

5. An apparatus according to claim 4, wherein,
   said solid-state imaging device forms color video signals; and
   said electronic still camera includes matrix circuit means for forming a luminance signal from the color video signals in accordance with a predetermined formula for signal mixing;
   said exposure control means controlling said light exposure to cause the luminance signal formed by said matrix circuit means to be maintained substantially at a predetermined level in accordance with the first and second signals.

6. An apparatus according to claim 4, wherein said solid-state imaging device forms color video signals; and
   said electronic still camera includes matrix circuit means for forming a luminance signal from the color video signals in accordance with a predetermined formula for signal mixing;
   said exposure control means controlling said light exposure to cause a G-component of the color video signals to be maintained substantially at predetermined level in accordance with the first and second signals.

7. An apparatus according to claim 4, wherein,
   said solid-state imaging device includes a charge-coupled device;
   said photosensitive means includes a silicon photodiode; and
   said exposure control means controlling the light exposure to correct the first signal in accordance with the second signal to maintain a constant first signal.

8. An apparatus according to claim 7, wherein said exposure control means corrects a quantity of the incident light indicated by the first signal to higher value when the color temperature indicated by the second signal is low thereby increasing the light exposure to said solid-state imaging device.

9. An apparatus according to claim 4, wherein said exposure control means controls a diaphragm and a shutter of said electronic still camera.

10. An apparatus for controlling white balance and output signal level of an electronic still camera for shooting a scene with a solid-state imaging device to form color video signals representing an image of the scene, comprising:
    exposure control means for controlling light exposure to said solid-state imaging device;
    variable amplification means for amplifying color-separated signals of the color video signals and having adjustable amplification gains for respective ones of the color-separated signals;
    photosensitive means for receiving incident light from the scene to produce a first signal representing a quantity of the incident light;
    color temperature sensing means for measuring the color temperature of the scene to produce a second signal representing the color temperature;

control means responsive to the first and second signals for controlling said exposure control means and said variable amplification means;

said control means maintaining the output of the color-separated signals substantially at a predetermined level to compensate for changes in white balance and differences in sensitivity characteristics of said solid-state imaging device due to the incident light intensity and the color temperature.

11. An apparatus according to claim 10, wherein said control means controls the output level of a G-component of the color-separated signals to be maintained substantially at a predetermined level in accordance with the first and second signals.

12. An apparatus according to claim 10, wherein,
said electronic still camera includes matrix circuit means for forming a luminance signal from the color video signal according to a predetermined formula for signal mixing;
said control means controlling the luminance signal formed by said matrix circuit means to be maintained substantially at a predetermined level in accordance withthe first and second signals.

13. An apparatus according to claim 10, wherein
said control means controls the light exposure to correct the first signal in accordance with the second signal, controls said exposure means and said variable amplification means in accordance with the corrected signal, and controls said variable amplification means by the corrected signal and the second signal.

14. An apparatus according to claim 10, wherein said exposure control means controls a diaphragm and a shutter of said electronic still camera.

15. An apparatus according to claim 14, wherein, said control means includes memory means or storing look up table data to derive the gains of said variable amplification means for the respective color-separated components of the video signals, the aperture extent of the diaphragm and an exposure time of the shutter, with the first and second signals used as parameters;
said control means consulting the table data corresponding to the first and second signals for controlling said diaphragm, shutter and variable amplification means.

16. A camera control apparatus for controlling white balance and output signal level of an electronic still camera for photographing a scene with a solid-state imaging device to form color video signals representing the scene, comprising:
exposure control means for controlling light exposure to said solid-state imaging device;
variable amplification means for amplifying color-separated components of the color video signals and having adjustable amplification gains for respective ones of the color-separated components;
incident color component sensing means for receiving light incident from the scene to produce signals representing values of respective color components of the incident light; and
control means for controlling said variable amplification means and said exposure control means in response to values of incident light and color temperature derived from the signals from said incident color component sensing means;
said control means maintaining an output of the color video signals substantially at a predetermined level to adjust the white balance to compensate for changes caused by differences in sensitivity characteristics of said solid-state imaging device caused by variations in incident light quantity and color temperature of the scene.

17. An apparatus according to claim 16, wherein said light exposure control means controls a diaphragm and a shutter of said electronic still camera.

18. An apparatus according to claim 17, wherein,
said control means includes memory means for storing look up table data to derive the gains of said variable amplification means for the respective color-separated components of the video signals, the aperture extent of the diaphragm and an exposure time of the shutter, using signal values from said incident color component sensing means as parameters;
said control means consulting said table data corresponding to the signals from said incident color component sensing means to control said diaphragm, shutter and variable amplification means.

19. An apparatus according to claim 16, wherein said control means determines the color temperature of the scene from the signals of respective color components from said incident color component sensing means, corrects the signal of the incident light quantity determined in accordance with said signals from said incident color component sensing means, controls said exposure control means in response to the corrected signal of the incident light quantity and causes said variable amplification means to be controlled in accordance with the corrected signal of the incident light quantity and the determined color temperature.

20. An apparatus according to claim 16, wherein said control means controls said exposure control means in accordance with the signal from said incident color sensing means to cause an output level of a G-component of the color-separated signals to be maintained substantially at a predetermined level.

21. An apparatus according to claim 16, wherein,
said electronic still camera includes matrix circuit means for forming a luminance signal from the color video signals in accordance with a predetermined formula for signal mixing;
said control means controlling said exposure control means in accordance with signals from aid incident color component sensing means to cause the luminance signal produced from said matrix circuit means to be maintained substantially at a predetermined level.

* * * * *